E. MAY.
Improvement in Prison Gratings.

No. 114,584.  Patented May 9, 1871.

Witnesses
M. L. Dews.
H. C. Chandler.

Inventor
Edwin May.

United States Patent Office.

EDWIN MAY, OF INDIANAPOLIS, INDIANA.

Letters Patent No. 114,584, dated May 9, 1871.

IMPROVEMENT IN PRISON-GRATINGS.

The Schedule referred to in these Letters Patent and making part of the same.

I, EDWIN MAY, of Indianapolis, in the county of Marion, State of Indiana, have invented certain Improvements in the Construction of Prison-Gratings, of which the following is a specification.

Nature and Objects of the Invention.

My invention relates to prison-gratings; and

It consists in the construction and arrangement of a saw and file-proof clamp-guard to the bolts or rivets, which is composed of soft iron and hard steel, or soft and hard steel, in combination with the form and arrangement of the grate-bars, and the manner of bolting or riveting them together, said bars and rivets or bolts being made of a similar material, the object being to present still further obstacles to the bolts or rivets being sawed off.

Description of Accompanying Drawing.

Figure 3 is a vertical transverse section taken on line $x\,x$, fig. 5.

General Description.

Figure 1:
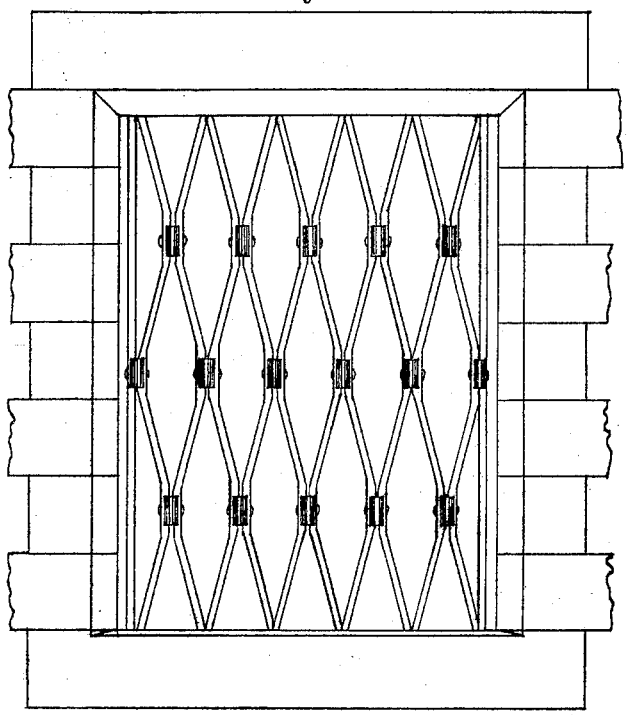
Figure 1 is an elevation of a prison-window grating embodying my invention.
Figure 2:
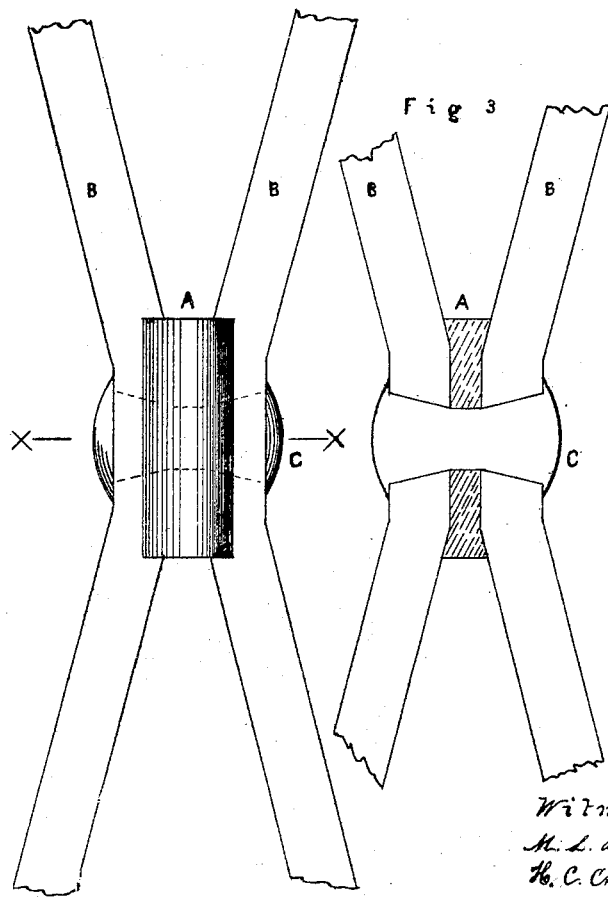
Figure 2 is an enlarged view of two of the grate-bars, showing more clearly the arrangement of the bolt, clamp-guard, and the mode of bolting or riveting them together.
Figure 4:
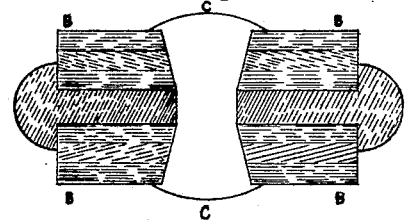
Figure 4 is a horizontal section taken on line $x\,x$, fig. 3.
Figure 5:
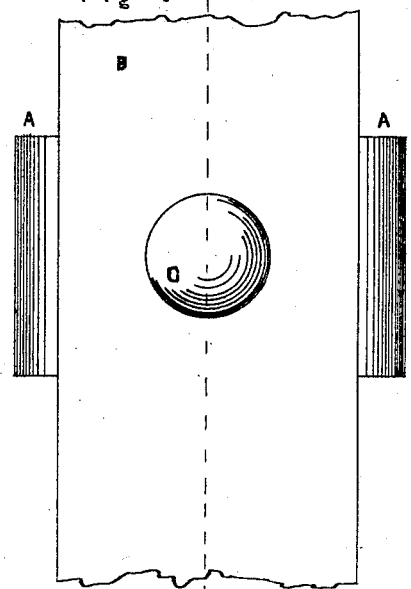
Figure 5 is a side view of the grate-bars at the place where they are bolted together.

B are the grate-bars, made of hardened steel, or, preferably, composed of either hard and soft steel or soft iron and hardened steel, formed as shown in figs. 1 and 2.

At the place where the bars are brought near each other so as to be bolted or riveted together I place a plate or clamp-guard, A, formed as shown, and constructed of any saw or file-proof material, similar to the bars B.

The outer ends of this clamp-guard are shouldered, as shown, so as to prevent the bars from being moved laterally; and this projecting shoulder or cap also renders it more difficult to be sawed into in order to reach the rivet or bolt C.

The bolts C pass through both bars B and the guard A, as shown.

The advantage of this construction of the gratings is the perfect security offered over the old method of common iron window-grates; however large the bars they could be easily sawed off, and the larger the bars the more obstruction to light and ventilation.

The peculiar form and use of my clamp-guard will be more readily understood when it is known that the bars have to be hardened before being riveted together, as the grating completed would be too large and unwieldy for any heat to be brought to bear on it in order to temper it for the hardening process, and being riveted together with the rivets red hot in order to swage them down to fill the tapered or rose-drilled holes in the bars. This will leave the rivets, after the grating is all built up, in a soft or untempered state, and, unprotected, would not resist a saw or file, yet in its strongest state for securely holding together the bars within the clamp-guard and the clamp-guard between the bars; the head of the rivets or bolts outside of the bars may then be cut off and no separation will take place, as the taper-drilled holes form a dovetail-rivet or bolt.

The bars and clamp-guard being both saw and file-proof, the peculiar shape of the clamp-guard effectually protects the rivets or bolts from the saw or file, rendering the whole arrangement proof against any of the common devices of prison-breakers to saw out. This form of grating can be used for prison-doors and inside-corridor partitions.

I make no claim to the combined steel and iron and the taper-shaped or dovetailed bolt; but What I do claim as my invention is—

The clamp-guard A, in combination with the bars B and bolt C, all constructed and arranged substantially as and for the purposes set forth.

EDWIN MAY.

Witnesses:
WM. H. WEEKS,
O. F. MAYHEW.